March 28, 1939.    R. A. GOEPFRICH    2,152,040
BRAKE
Filed Oct. 14, 1935    2 Sheets-Sheet 1

INVENTOR.
RUDOLPH A. GOEPFRICH.
BY Jerome R. Cox
ATTORNEY.

March 28, 1939. R. A. GOEPFRICH 2,152,040
BRAKE
Filed Oct. 14, 1935 2 Sheets-Sheet 2

INVENTOR.
RUDOLPH A. GOEPFRICH
BY Jerome R. Cox
ATTORNEY.

Patented Mar. 28, 1939

2,152,040

UNITED STATES PATENT OFFICE 2,152,040

BRAKE

Rudolph A. Goepfrich, South Bend, Ind., assignor to Bendix Products Corporation, South Bend, Ind., a corporation of Indiana Application October 14, 1935, Serial No. 44,844

10 Claims. (Cl. 188—71)

This invention relates to brakes and is illustrated in a drum brake having a plurality of shoes arranged to be moved into contact with a rotating drum.

One of the objects of the invention is the provision of means for utilizing substantially 360° of braking surface in the braking operation.

A further object of the invention is the provision of new and improved means of forcing a plurality of shoes outwardly into contact with the drum for performing the braking function.

A further object of the invention is the provision of new and improved means for changing axial applying force into radial applying force, said radial application acting at a plurality of uniformly spaced points.

One of the features of the invention is the provision of a plurality of conically shaped rollers through which axial movement of the shoes is changed into radial actuation.

Further features and objects of the invention will be apparent after a reading of the subjoined specification and claims and after a consideration of the accompanying drawings, in which:

Figure 3:
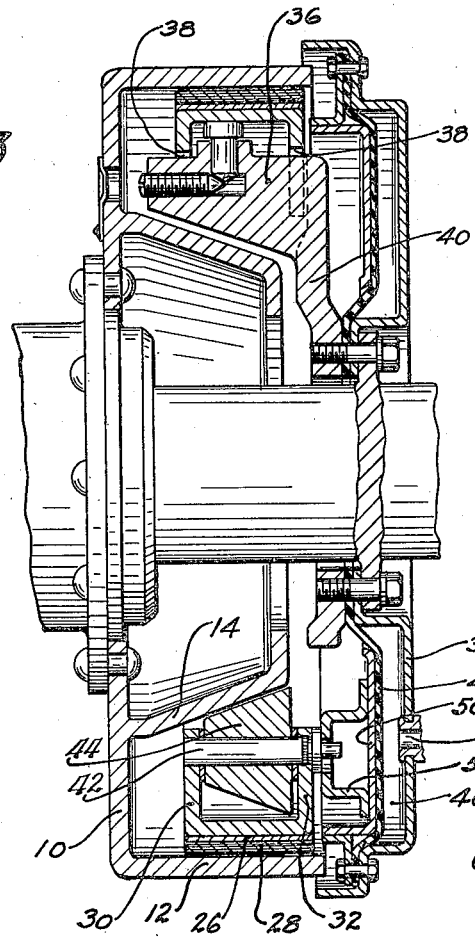
Figure 3 is a view in vertical section taken substantially on the line 3—3 of Figure 1.

Referring especially to the drawings and especially to Figure 3, it may be seen that I have shown a brake drum 10 formed with an external circumferential flange 12 and an internal conically shaped flange 14. Interposed between the flanges 12 and 14 are a plurality of brake shoes 16, 18, 20 and 24. Each of the shoes is formed like each of the others and description of one of the shoes will be sufficient for an understanding of all. Each of the shoes is formed with an arcual rim portion 26 to which there is secured a brake shoe lining 28 arranged to contact with the flange 12. Each shoe is also formed with a pair of perpendicular web portions 30 and 32 arranged parallel to each other.

The shoes are carried upon a backing plate 34 which is secured to the chassis of the vehicle and will be described in detail subsequently, the shoes being held in place largely by means of bosses 36 which extend through slots 38 formed in the web portions 30. The bosses 36 are formed on a casting 40 bolted to the backing plate proper.

Figure 1:
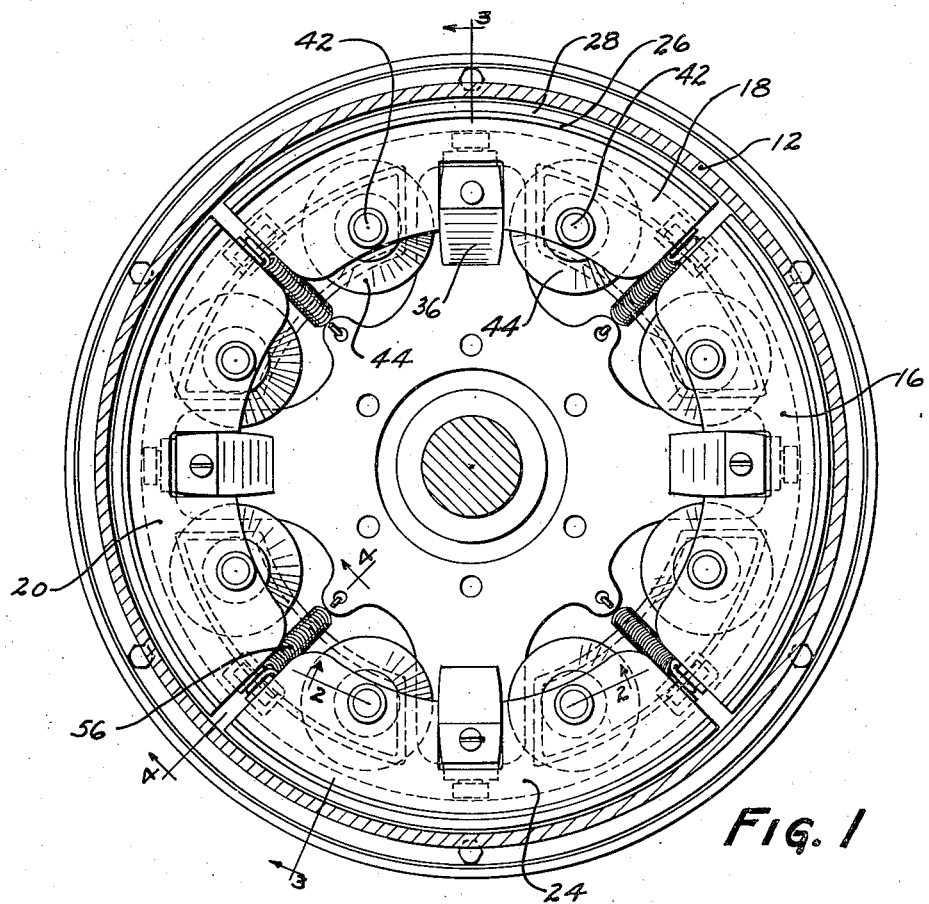
Figure 1 is a view in vertical section of a brake constructed according to my invention.
Figure 2:
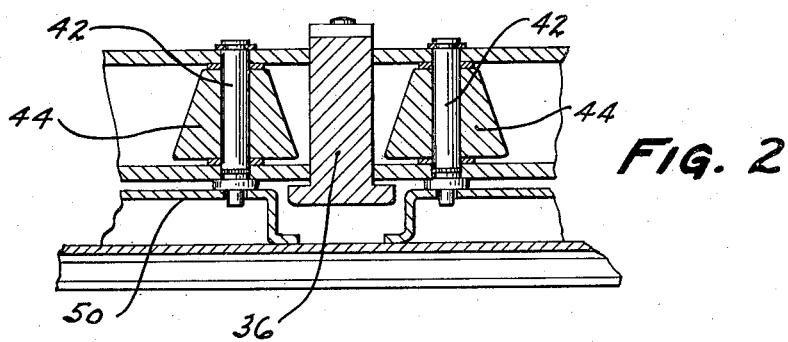
Figure 2 is a fragmentary view in section taken substantially on the line 2—2 of Figure 1.

Means are provided for moving the shoes radially into contact with the drum. This means comprises a conical surface arranged to coact with the conical flange 14 whenever the shoes are moved axially to cause the two conical surfaces to contact. For instance, the inner portion of each shoe may be provided with a conical flange parallelling the surface 14, the flange carrying a friction material. However, I prefer to provide conical rollers 44 as shown in Figures 1, 2 and 3. Mounted in bearings provided in each of the shoes are a pair of pins 42 each of which carries a conical roller 44 arranged to contact with the conical flange 14. Upon movement of the brake shoes including the conical rollers to the left as shown in Figure 3, the rollers contact with the conical flange and thus force the shoe radially outward into contact with the flange 12. Inasmuch as the shoes are prevented from moving circumferentially by the anchor bosses 36 the shoes exert a retarding force upon the rotating drum and thus retard the wheel.

Means are provided for moving the shoes axially of the drum. The backing plate is formed with an annular recess 46 on the inner face of which there is secured an annular diaphragm 48. Contacting with this annular diaphragm is an annular stamping 50 which in turn contacts with elements 52 secured to the outer end of the pins 42. In actuating the brake, fluid under pressure is supplied to the recess 46 through an inlet opening 54 and thus the diaphragm 48 is moved inwardly thus forcing the associated shoe together with its rollers 44 to contact with the flange 14. Then the wedging action of the two conical surfaces forces the shoes outward into contact with the flange 12 of the drum.

Figure 5:
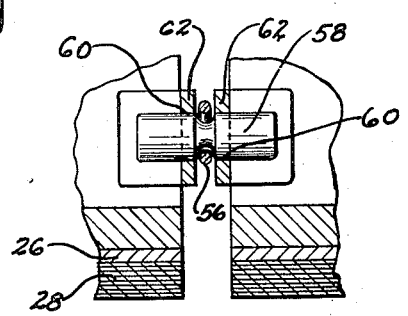
Figure 5 is a fragmentary view taken substantially on the line 5—5 of Figure 4.

For bringing the shoes back to their released position there are provided springs 56 secured at one end to the casting 40 and at their opposite end to a pin 58 (see Figure 5), loosely fitted in recesses 60 formed in ears 62 provided on one of the webs 30 of the shoes.

In the operation of the device fluid under pressure introduced into the recess 46 causes the movement of the diaphragm 48 inward, thus acting through the stamping 50 on the elements 52 to force the rollers 44 into contact with the conical surface 14 thus forcing the shoes 16, 18, 20 and 24 outwardly into contact with the flange 12 of the rotating drum and braking the vehicle.

Upon the withdrawal of pressure the springs 56 withdraw the shoes both axially and radially from contact with the drum.

Figure 6:
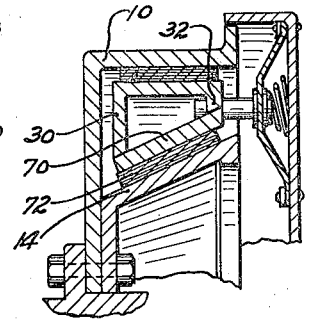
Figure 6 is a fragmentary view similar to Figure 5 showing a modification.
Figure 4:
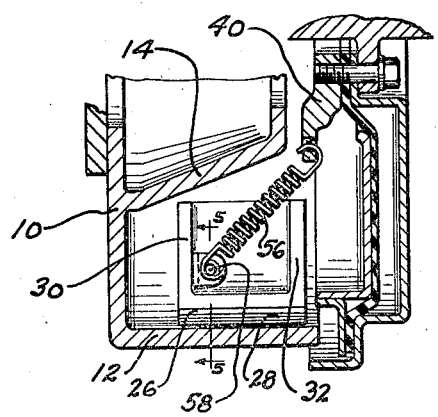
Figure 4 is a fragmentary view in section taken substantially on the line 4—4 of Figure 1.

In Figure 6 there is shown an arrangement utilizing a conical friction surface instead of conical rollers, like numerals designating similar parts. The inner ends of the webs 30 and 32 are joined by a conical flange 70 carrying a friction material or lining 72 which is arranged upon axial movement of the shoes to contact with the surface 14. In this arrangement the fluid actuator is operated by vacuum so that a pull inward is exerted on the shoes and thus there is never any tendency to push the wheel from the axle.

It is to be understood that the above described embodiment of my invention is for the purpose of illustration only and various changes may be made therein without departing from the spirit and scope of the invention.

I claim:

1. A brake comprising a drum formed with a cylindrical surface and a conical surface, a friction element provided with a plurality of conical rollers, and means for moving said friction element axially into contact with said drum.

2. In a brake a drum formed with a conical flange and a cylindrical flange, a friction element formed with a surface cooperating with said cylindrical flange, and provided with a conical roller adapted to cooperate with said conical surface, means for moving said conical roller into contact with said conical surface whereby the first mentioned portion of the friction element is moved into contact with the cylindrical surface.

3. In a brake a drum formed with a conical flange and a cylindrical flange, a friction element formed with a surface cooperating with said cylindrical flange and provided with a conical roller adapted to cooperate with said conical surface, means for moving said conical roller into contact with said conical surface whereby the first mentioned portion of the friction element is moved into contact with the cylindrical surface, said means for moving the rollers into contact with the conical surface comprising an annular fluid chamber, and means for introducing fluid under pressure into said chamber.

4. In a brake a drum formed with a conical flange and a cylindrical flange, a brake shoe provided with a rim portion and a pair of webs, the rim portion being formed with a surface cooperating with said cylindrical flange, and the webs being provided with a conical roller adapted to cooperate with said conical surface and with a pin supporting said roller, means for moving said conical roller into contact with said conical surface whereby the rim portion of the shoe is moved into contact with the cylindrical surface.

5. In a brake a drum formed with a conical flange and a cylindrical flange, a friction element comprising a plurality of shoes each formed with a surface cooperating with said cylindrical flange and each provided with a plurality of conical rollers adapted to cooperate with said conical surface, and means for moving said conical rollers into contact with said conical surface whereby the first mentioned portion of the friction element is moved into contact with the cylindrical surface.

6. A brake comprising a drum formed with a cylindrical flange and a conical flange, a plurality of shoes arranged within said drum, each shoe being formed with a cylindrical surface cooperating with the cylindrical surface of the flange of said drum and each being provided with a plurality of conical rollers cooperating with the conical surface of said drum, and means for moving said rollers into contact with said conical surface.

7. A brake comprising a drum formed with a cylindrical flange and a conical flange, a plurality of shoes arranged within said drum, each shoe being formed with a cylindrical surface cooperating with the cylindrical surface of the flange of said drum and with a plurality of anchor slots and each being provided with a plurality of conical rollers cooperating with the conical surface of said drum, means for moving said rollers into contact with said conical surface, and an anchor member extending through said slots.

8. In a brake a drum formed with a conical flange and a cylindrical flange, a friction element comprising a plurality of shoes each formed with a surface cooperating with said cylindrical flange and each provided with a plurality of conical rollers adapted to cooperate with said conical surface, means for moving said conical rollers into contact with said conical surface whereby the first mentioned portion of the friction element is moved into contact with the cylindrical surface, and springs positioned to withdraw said shoes both radially and axially.

9. A brake comprising a drum formed with a cylindrical surface and a conical surface, friction means having a cylindrical friction surface adapted to be moved into contact with said first named cylindrical surface and having a portion adapted to be moved into contact with said conical surface, and means for moving both said friction means axially into contact with said drum.

10. A brake comprising a drum formed with a cylindrical surface and a conical surface, friction means comprising a plurality of segments movable axially and radially of the brake and having friction surfaces adapted to cooperate with said cylindrical surface and parts adapted to cooperate with said conical surface, and means for moving the friction means axially into contact with said drum.

RUDOLPH A. GOEPFRICH.